(12) United States Patent
Kief et al.

(10) Patent No.: US 9,123,361 B1
(45) Date of Patent: Sep. 1, 2015

(54) READER WITH AT LEAST TWO-SPIN DETECTORS

(71) Applicant: Seagate Technology LLC, Cupertino, CA (US)

(72) Inventors: Mark Thomas Kief, Lakeville, MN (US); Dimitar Velikov Dimitrov, Edina, MN (US); Javier Ignacio Guzman, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/264,551

(22) Filed: Apr. 29, 2014

(51) Int. Cl.
*G11B 5/33* (2006.01)
*G11B 5/265* (2006.01)

(52) U.S. Cl.
CPC . *G11B 5/265* (2013.01); *G11B 5/33* (2013.01)

(58) Field of Classification Search
USPC ....................................................... 360/316
See application file for complete search history.

(56) References Cited

U.S. PATENT DOCUMENTS

| 7,522,392 | B2* | 4/2009 | Carey et al. | 360/324.2 |
| 8,125,011 | B2 | 2/2012 | Johnson | |
| 8,270,208 | B2* | 9/2012 | Gaidis et al. | 365/158 |
| 8,324,672 | B2 | 12/2012 | Sasaki et al. | |
| 8,435,653 | B2* | 5/2013 | Sasaki | 428/815 |
| 8,619,393 | B2 | 12/2013 | Stokes | |
| 2008/0123222 | A1* | 5/2008 | Daughton et al. | 360/316 |
| 2011/0194341 | A1* | 8/2011 | Gaidis et al. | 365/171 |
| 2011/0242701 | A1* | 10/2011 | Ohtake et al. | 360/99.08 |
| 2012/0288964 | A1* | 11/2012 | Gaidis et al. | 438/3 |
| 2013/0050875 | A1* | 2/2013 | Yamada et al. | 360/125.3 |

* cited by examiner

*Primary Examiner* — Wayne Young
*Assistant Examiner* — Carlos E Garcia
(74) *Attorney, Agent, or Firm* — Hollingsworth Davis, LLC

(57) ABSTRACT

A later spin valve multi-reader includes at least two spin detectors, a spin injector and a spin diffusion medium. The spin diffusion medium bridges the spin detectors and the spin injector. Each of the spin detectors detects a unique spin accumulation signal.

26 Claims, 10 Drawing Sheets

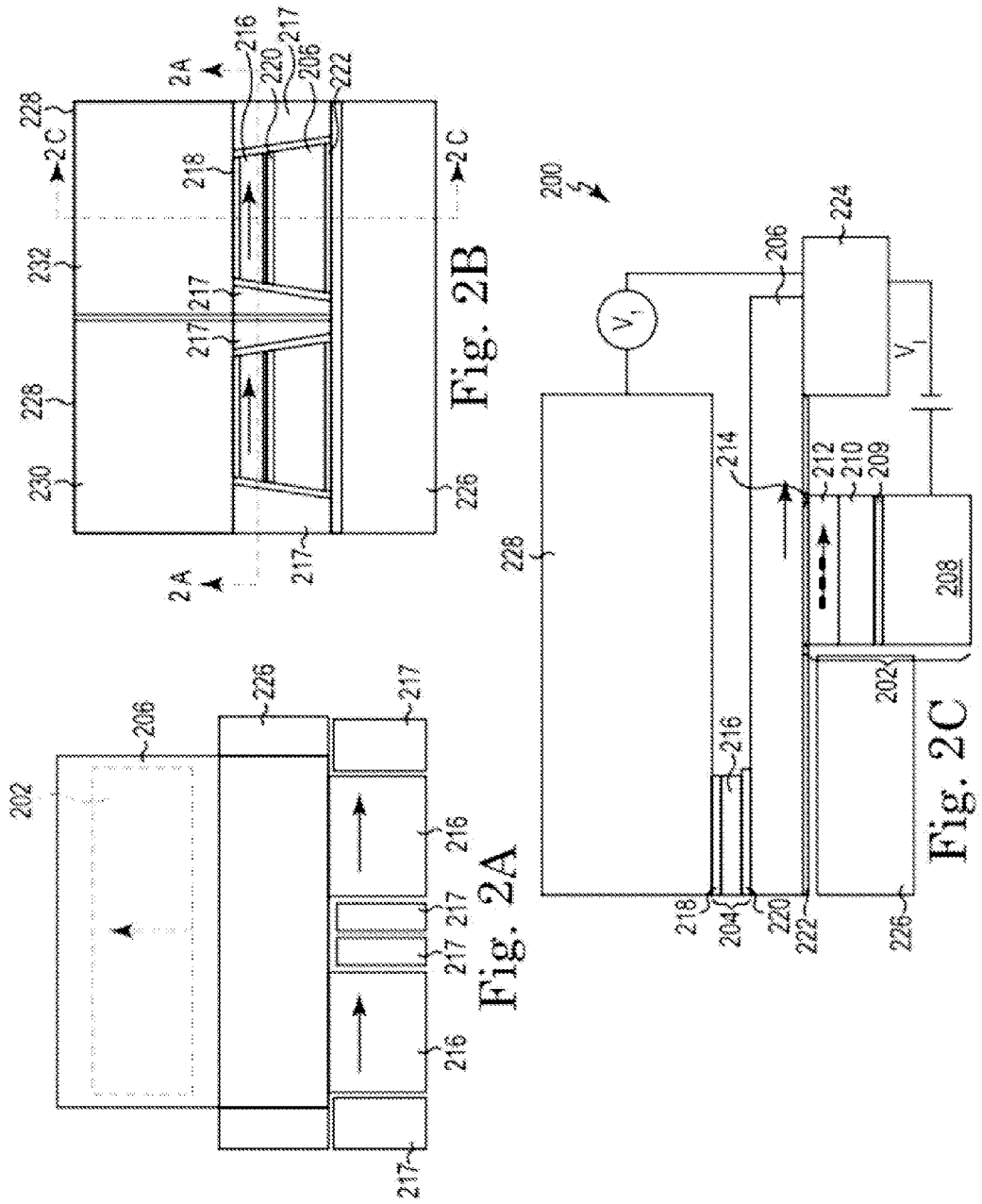

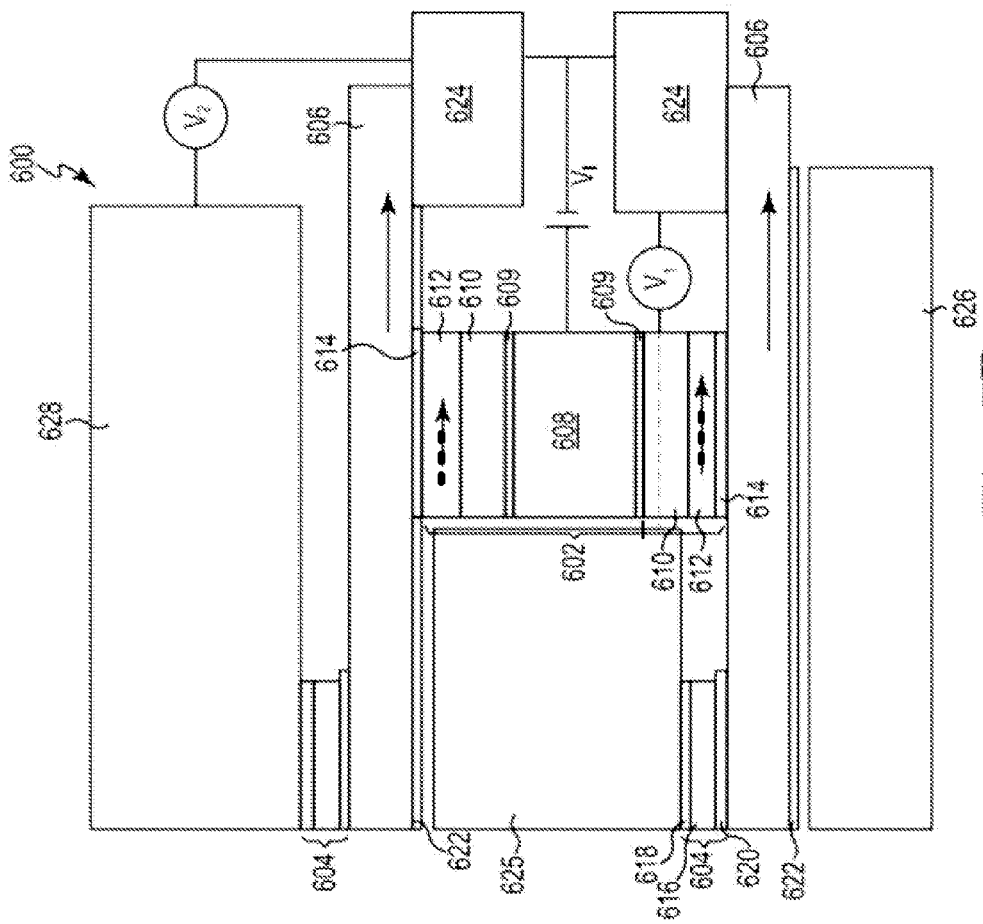
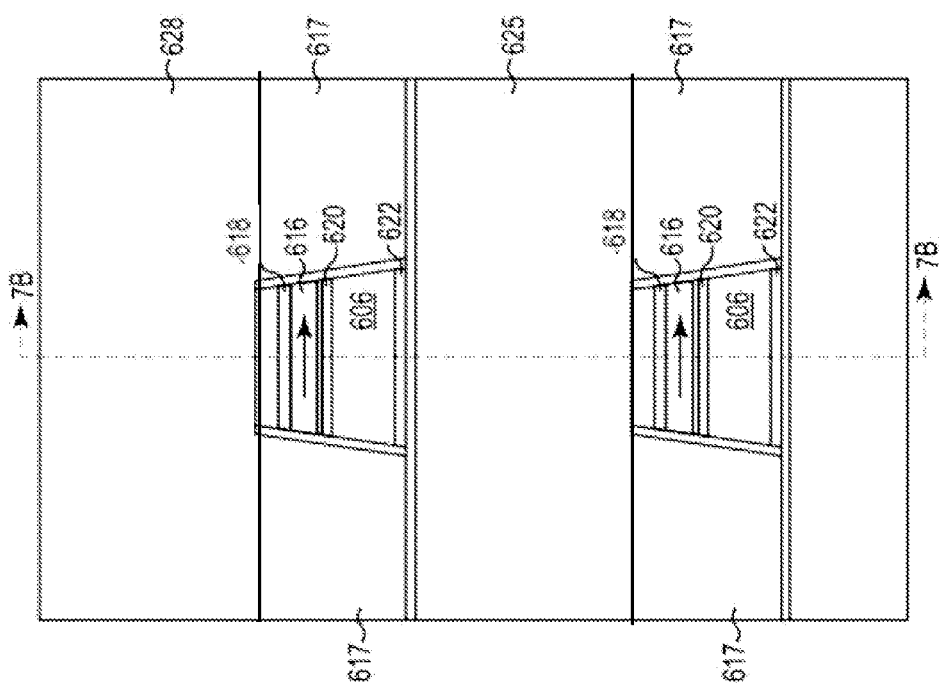

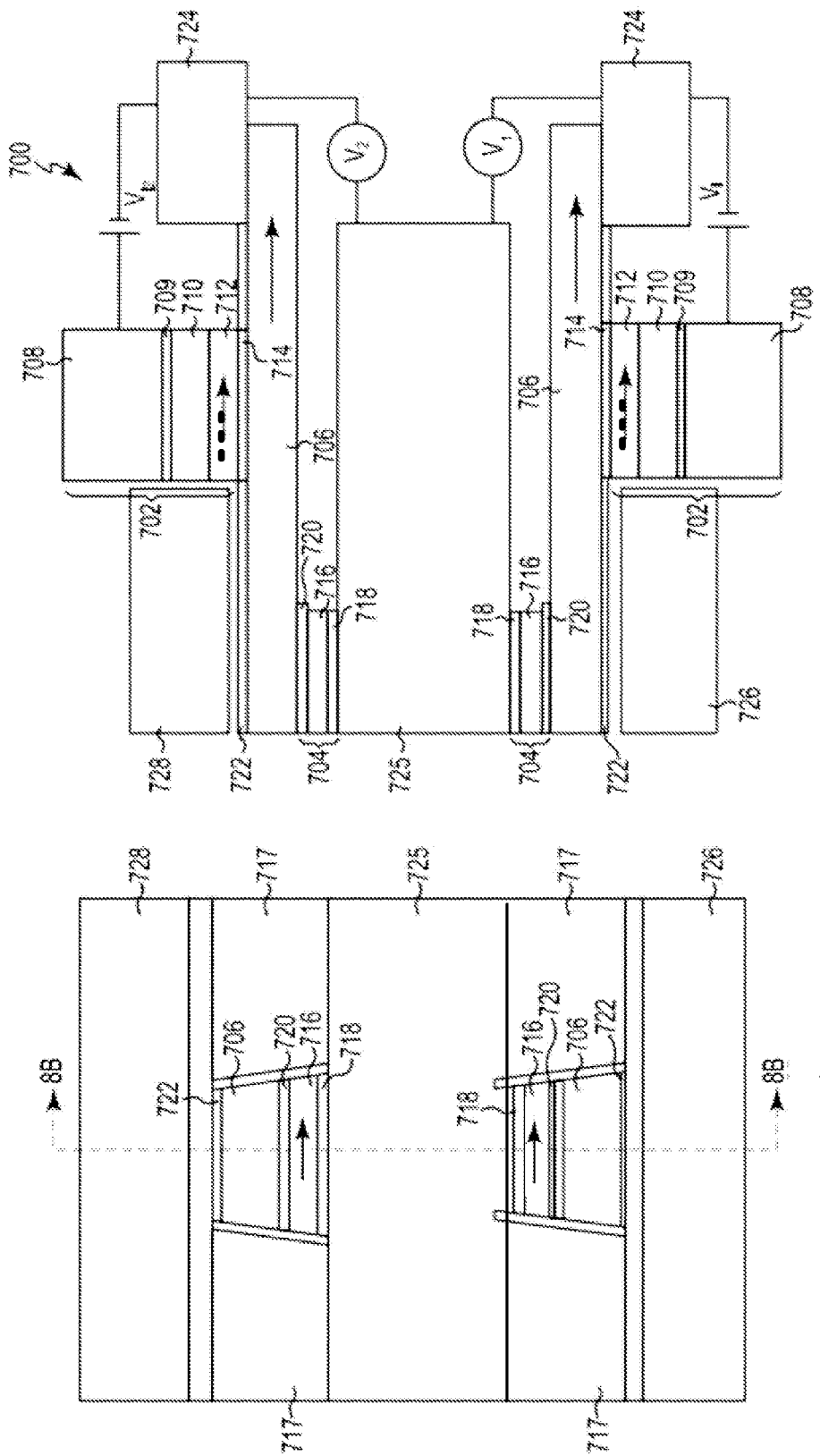

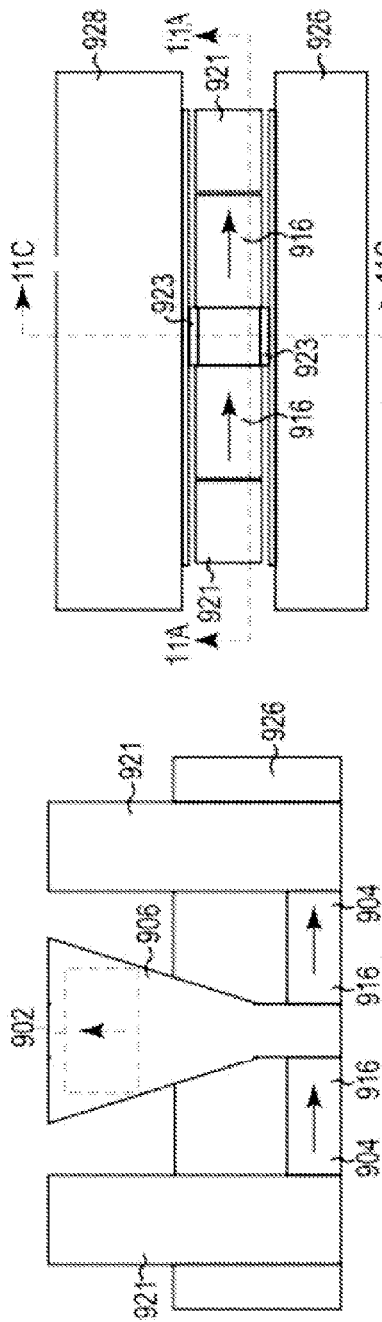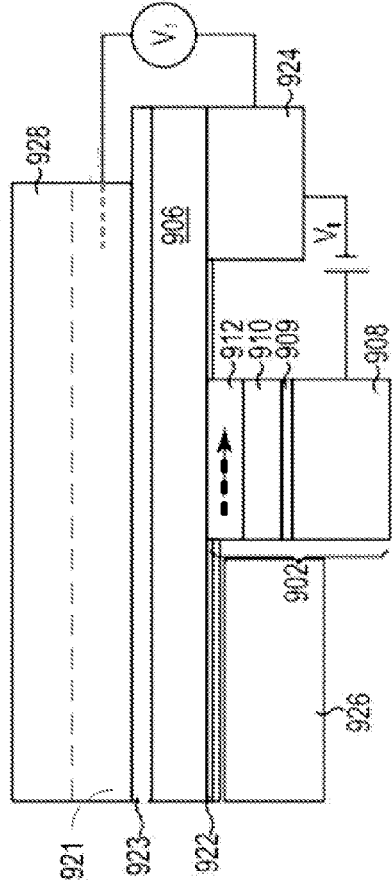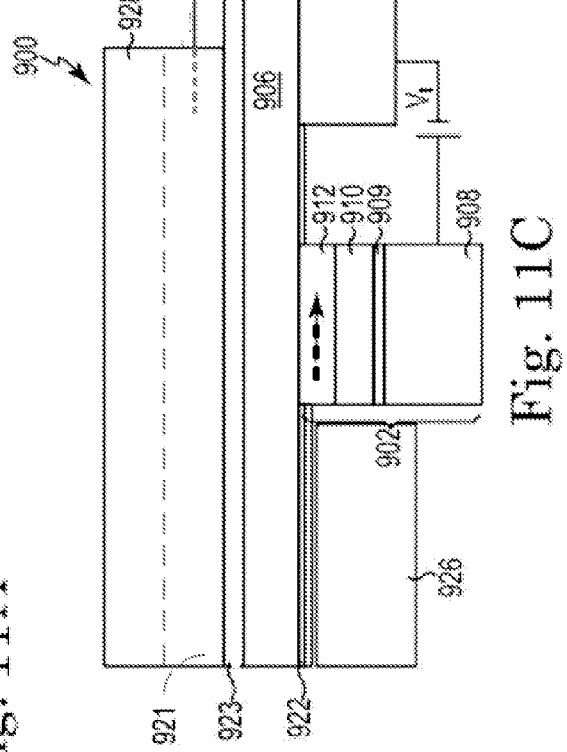
Fig. 11A
Fig. 11B
Fig. 11C

READER WITH AT LEAST TWO-SPIN DETECTORS

SUMMARY

A lateral spin valve (LSV) multi-reader includes at least two spin detectors, a spin injector and a spin diffusion medium. The spin diffusion medium bridges the spin detectors and the spin injector. Each of the spin detectors detects a unique spin accumulation signal.

A lateral spin valve multi-reader includes a means for injecting a polarized current, a means for both receiving the injected current and for producing a polarized spin accumulation associated with the injected current, and at least two means for detecting. Each means for detecting detects a portion of the spin accumulation.

A process for reading by a lateral spin valve multi-reader includes the steps of injecting a polarized spin current into a spin diffusion medium to produce an associated spin accumulation, detecting a first portion of the spin accumulation and detection a second portion of the spin accumulation.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 2A-2C depict a lateral spin valve multi-reader according to various embodiments with FIG. 2A providing a top view, FIG. 2B providing an air barrier surface (ABS) view, and FIG. 2C providing a side view.

FIGS. 7A-7B depict a lateral spin valve multi-reader according to various embodiments with FIG. 7A providing an ABS view and FIG. 7B providing a side view.

FIGS. 8A-8B depict a lateral spin valve multi-reader according to various embodiments with FIG. 8A providing an ABS view and FIG. 8B providing a side view.

FIGS. 11A-11C depict a lateral spin valve multi-reader according to various embodiments with FIG. 11A providing a top view, FIG. 11B providing an ABS view, and FIG. 11C providing a side view.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desire to store more electronic data and to access that data more quickly is ever increasing. As such, various technologies have been developed to help meet these desires. For example, progress in the development of giant magnetoresistive (GMR) spin valve materials and high-sensitivity spin valve read heads has allowed a continuous increase of areal recording density in hard disk drives.

Figure 1:
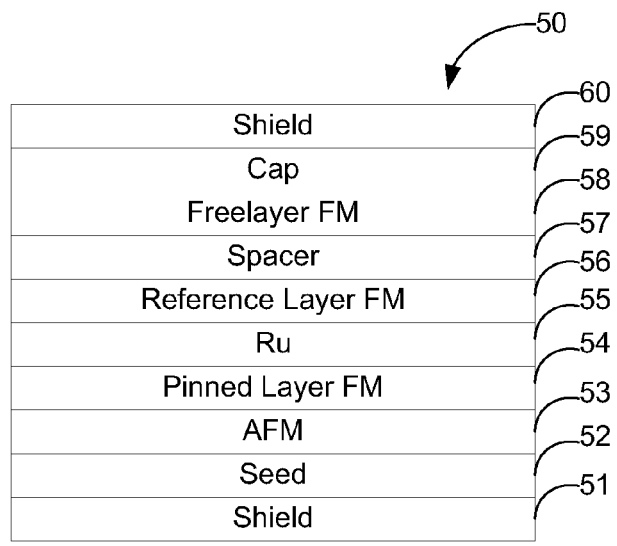
FIG. 1 is an example of a CPP bottom spin valve.

One type of spin valve currently being used within the read head of a disk drive is a current perpendicular to the plane (CPP) bottom spin valve. An example of a CPP bottom spin valve 50 is shown in FIG. 1. The CPP bottom spin valve 50 comprises a stack that includes a bottom shield 51, a seed layer 52, an anti-ferromagnetic layer (AFM) 53, a pinned ferromagnetic layer 54, a coupling layer 55 of Ru, a ferromagnetic reference layer 56, a spacer 57, a ferromagnetic free layer 58, a cap 59 and a top shield 60. In this configuration, the magnetization direction of the pinned ferromagnetic layer 54 is fixed by exchange coupling with the adjacent AFM 53. The ferromagnetic free layer 58 provides a layer in which the magnetization vector can rotate in response to electromagnetic fields. The rotation of magnetization in the free layer 58 relative to the fixed layer magnetization generates a resistance change that is detected as a voltage change when a sense current is passed through the structure in a direction that is perpendicular to the stack. The length of the spin valve 50, i.e., the distance between shields, defines downtrack readback resolution. The width of the free layer approximately defines the crosstrack readback width.

While spin valve readers have assisted in the ability to read electronic data, they are not without their limitations. Because spin valves are comprised of a vertical heterostructure they present a physical configuration that is difficult to integrate with other devices. Specifically, spin valve readers are limited in shield-to-shield spacing by the need to include synthetic anti-ferromagnetic layer pinned by an anti-ferromagnetic layer. Multi-reader spin valve concepts, such as a two-dimensional magnetic recording (TDMR), are similarly limited in shield-to-shield spacing and are also challenged by difficulties for narrow cross-track spaced readers.

The present disclosure describes various embodiments of lateral spin valve multi-reader configurations which allow for reduced shield-to-shield spacing and narrow cross-track spacing for areal densities above 1 Tbpsi. The various embodiments provide compact geometries for readers aligned along either downtrack or crosstrack directions.

Referring now to FIGS. 2A-C, an example embodiment of a lateral spin valve multi-reader 200 is depicted. The diagram in FIG. 2B is a view from the media facing surface, and FIGS. 2A and 2C are respective cross sections taken along lines 2A-2A and 2C-2C. The reader 200 includes a spin injector 202, two individual free layer spin detectors 204 for sensing nearby hard disk tracks, and a spin diffusion medium, e.g., channel 206 (with arrow indicating the direction of charge current flow), that bridges the spin injector 202 and spin detectors 204. The spin injector 202 includes an injector contact 208, a seed layer 209, an anti-ferromagnetic layer 210, and a ferromagnetic layer 212. The spin injector 202 may optionally include a barrier layer 214 between the ferromagnetic layer 212 (with direction of magnetization indicated by the arrow) and the channel 206 to optimize the signal-to-noise ratio. In addition the injector may utilize a pinned SAF structure by substituting the simple ferromagnetic layer 212 with a SAF formed from FM/Ru/FM, where FM designates a suitable ferromagnetic material such as Co, FeCo with high spin polarization.

Figure 3:
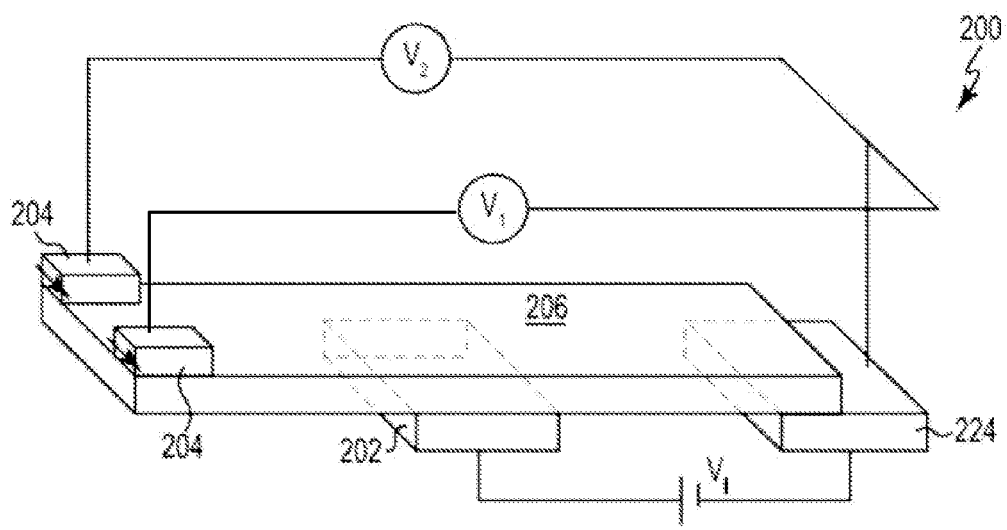
FIG. 3 illustrates the circuit created by the lateral spin valve multi-reader of FIGS. 2A-2C.

Each of spin detectors 204 includes a ferromagnetic free layer 216 (with direction of magnetization indicated by the arrow), an isolation cap 218, and an optional barrier 220 to optimize the signal-to-noise ratio. Side shields 217, or permanent magnets, are provided to either side of each of the detectors 204. The channel 206 is a high quality conductor with a long spin diffusion length and is of a nonmagnetic metal, e.g., Cu, Ag, Al. Alternatively, the channel 206 may comprise a doped semiconductor material or other long spin mean free path material such as graphene. An isolation cap 222 is provided across portions of the bottom surface of the channel 206 as shown. The lateral spin valve multi-reader 200 further includes a current drain 224 to conduct charge, a bottom shield 226 and a top shield 228 that serves as the contact for the spin detectors 204. Note that the top shield is electrically split into a first portion 230 and a second portion 232 to allow detection of two reader signals against a common potential The circuit created by the embodiment of FIGS. 2A-2C is illustrated in FIG. 3. As shown, the multiple spin detectors 204 are provided with a common channel 206 and an injector/drain circuit. The application of a voltage, VI, between the spin injector 202 and the current drain 224 produces a charge current in the channel 206 and an associated spin accumulation in the channel 206. The spin accumulation can be measured as a voltage potential change, V1 and V2, at the spin detectors 204 which varies according to the relative orientation of the spin detectors' 204 and spin injector's 206 magnetization/spin directions. The configuration of the present embodiment presents a large injector area for a high injection current. The channel thickness is made thin, e.g., 10 nm or less, to provide higher spin density. The reduced stack thickness relative to common spin valves provides reduced shield-to-shield spacing with improved linear density resolution and the ability to more easily process adjacent reader stacks.

Figure 4A:
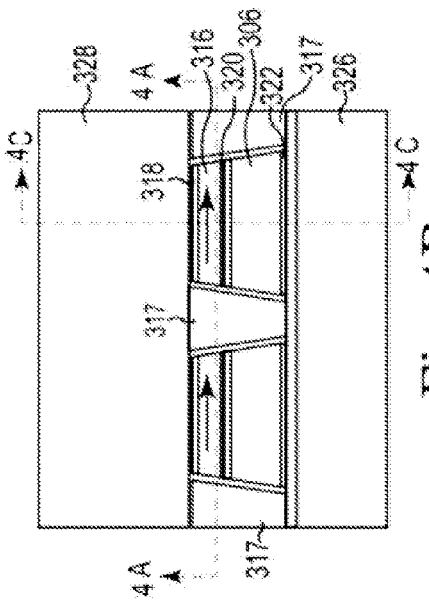
FIGS. 4A-4C depict a lateral spin valve multi-reader according to various embodiments with FIG. 4A providing a top view, FIG. 4B providing an ABS view, and FIG. 4C providing a side view.
Figure 4B:
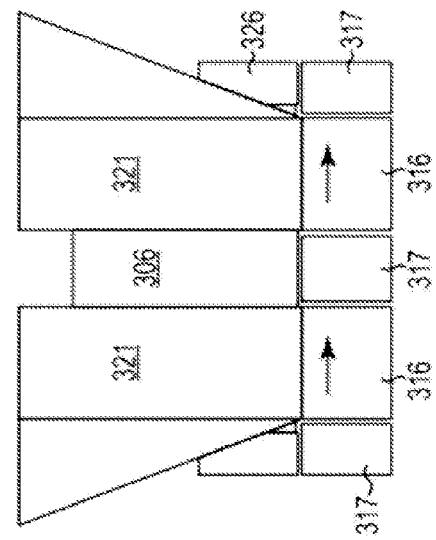
Figure 4C:
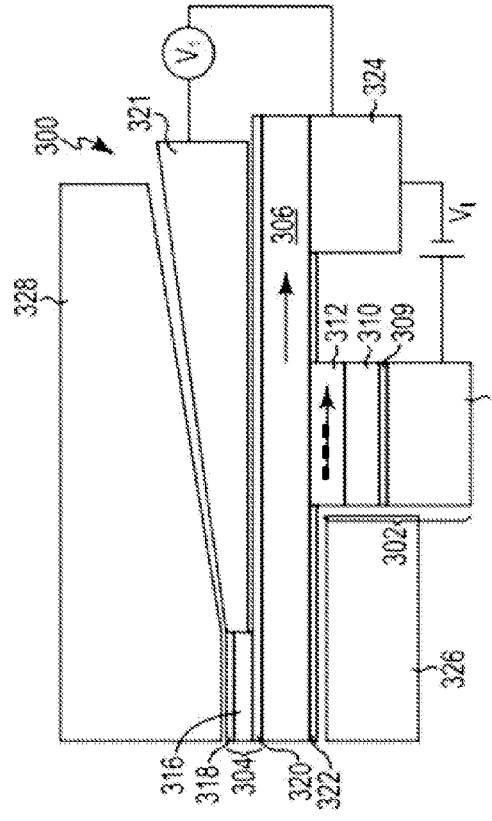

Referring now to FIGS. 4-6, variations on the embodiment of lateral spin valve multi-reader 200 are shown. FIGS. 4A-4C depict a lateral spin valve multi-reader 300 that includes a spin injector 302, two spin detectors 304 and a spin diffusion medium, i.e., channel 306 (with arrow indicating the direction of charge current flow) with indicated isolation cap 322, along with a current drain 324, top shield 328 and bottom shield 326. The spin injector 302 once again includes an injector contact 308, a seed layer 309, an anti-ferromagnetic layer 310 and a ferromagnetic layer 312 (with direction of magnetization indicated by the arrow). Each of the spin detectors 304 includes a ferromagnetic free layer 316 (with direction of magnetization indicated by the arrow), an isolation cap 318, and optional barrier 320. A side shield 317, or permanent magnet, is provided to either side of the detectors 304. However, different in this configuration, is that each of spin detectors 304 is in contact with a separate electrical lead/contact 321 and both spin detectors 304 and leads 321 are isolated from a solid top shield 328. The individual detector leads 321 enable individual sensing of detector voltage potentials without the use of the split top shield used in FIGS. 2A-2C. As in the previous embodiment, voltage, $V_I$, is applied between the spin injector 302 and the current drain 324 to produce a charge current and associated spin accumulation in channel 306. The spin accumulation is measured as a voltage potential change, $V_1$ and $V_2$ (not shown), by respective detectors 304.

Figure 5A:
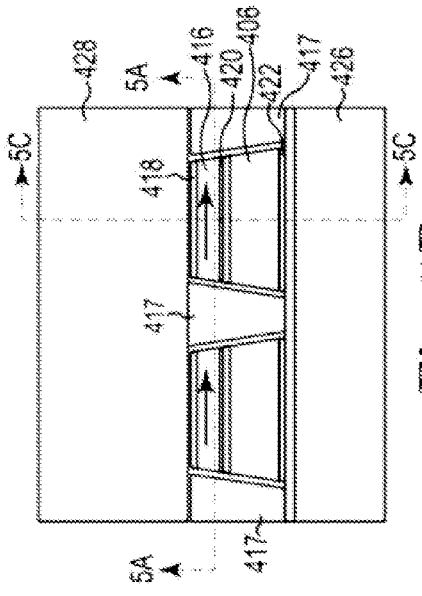
FIGS. 5A-5C depict a lateral spin valve multi-reader according to various embodiments with FIG. 5A providing a top view, FIG. 5B providing an ABS view, and FIG. 5C providing a side view.
Figure 5B:
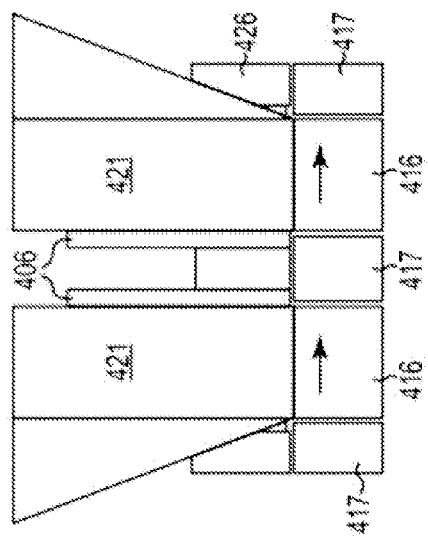
Figure 5C:
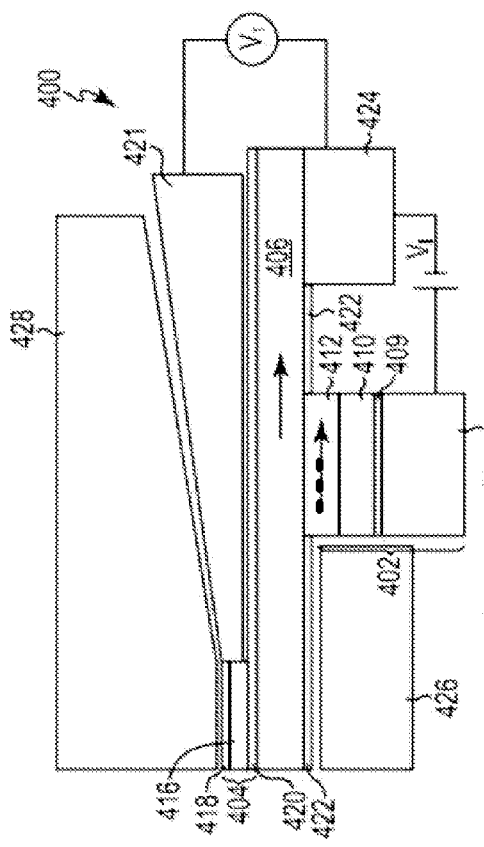

FIGS. 5A-5C depict a lateral spin valve multi-reader 400 with two distinct reader injector/channel/detector circuits. Specifically, lateral spin valve multi-reader 400 includes two spin injectors 402, two spin detectors 404 and two spin diffusion mediums, i.e., channels 406 (with arrow indicating the direction of charge current flow) with indicated isolation caps 422, and two current drains 424. A single, un-split top shield 428 and a single bottom shield 426 are also included. The spin injectors 402 each include an injector contact 408, an isolation cap layer 409, an anti-ferromagnetic layer 410 and a ferromagnetic layer 412 (with direction of magnetization indicated by the arrow). Each of the spin detectors 404 includes a ferromagnetic free layer 416 (with direction of magnetization indicated by the arrow), an isolation cap 418, an optional barrier 420, and a detector contact 421. A side shield 417, or permanent magnet, is provided to either side of the detectors 404. In this embodiment, voltage, $V_I$, is applied between each of the spin injectors 402 and its corresponding current drain 424 to produce a current charge and associated spin accumulation in each of the channels 406. The spin accumulation is measured as a voltage potential change, $V_1$ and $V_2$ (not shown), by respective detectors 404. The two distinct reader injector/channel/detector circuits of the present embodiment enable better separation of signal between readers and less dilution of the spin density due to the narrower crosstrack dimension of each of the channels 406.

Figure 6A:
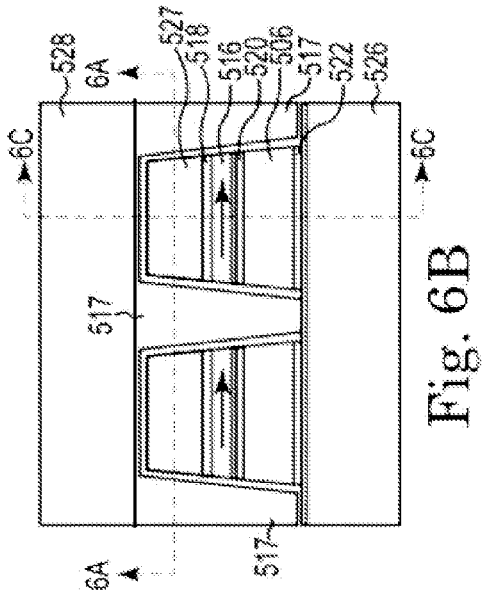
FIGS. 6A-6C depict a lateral spin valve multi-reader according to various embodiments with FIG. 6A providing a top view, FIG. 6B providing an ABS view, and FIG. 6C providing a side view.
Figure 6B:
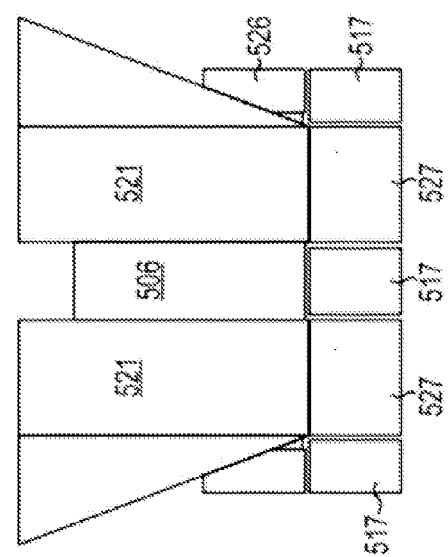
Figure 6C:
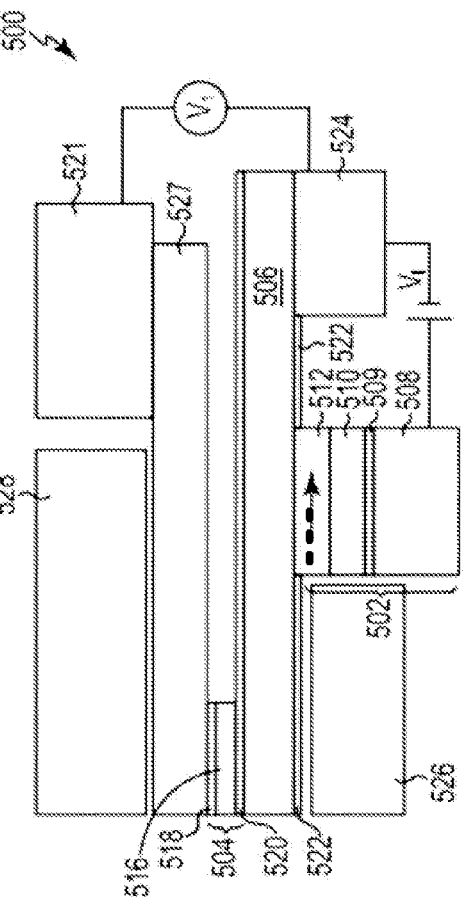

FIGS. 6A-6C depict a lateral spin valve multi-reader 500 that includes a spin injector 502, two spin detectors 504 and a common spin diffusion medium, i.e., channel 506 with indicated isolation cap 522, along with a current drain 524, a top shield 528 and a bottom shield 526. The spin injector 502 once again includes an injector contact 508, an isolation cap layer 509, an anti-ferromagnetic layer 510 and a ferromagnetic layer 512 (with direction of magnetization indicated by the arrow). Each of the spin detectors 504 includes a ferromagnetic free layer 516 (with direction of magnetization indicated by the arrow), an isolation cap 518, and barrier 520. A side shield 517, or permanent magnet, is provided to either side of the detectors 504. Each of the spin detectors 504 additionally includes an integrated in-stack shield 527 that functions as the electrical lead to the contact 521 for the spin detector 504 and functions as a local magnetic shield enabling easier processing and lower lead resistance than the embodiment of FIGS. 5A-5C. The in-stack shield 527 is an oriented, permeable thin magnetic layer or synthetic anti-ferromagnetic with low resistance which is isolated from the un-split, top shield 528. Voltage, $V_I$, is applied between the spin injector 502 and the current drain 524 to produce a current charge and associated spin accumulation in channel 506. The spin accumulation is measured as a voltage potential change, $V_1$ and $V_2$ (not shown), by respective detectors 504.

FIGS. 7A-B and 8 illustrate additional embodiments of the lateral spin valve multi-reader. In these embodiments stacked detectors utilize a shared magnetic shield. Specifically, with reference to FIGS. 7A-7B, lateral spin valve multi-reader 600 includes a central spin injector 602, two spin detectors 604, two spin diffusion mediums, i.e., two channels 606 (with arrow indicating the direction of charge current flow), two current drains 624, a bottom shield 626, a shared shield 625 and a top shield 628. The spin injector 602 includes a central injector contact 608 and, to either side of the contact 608, a cap/seed layer 609, an anti-ferromagnetic layer 610, a ferromagnetic layer 612 (with direction of magnetization indicated by the arrow), and an optional barrier 614 between layer 612 and the proximate channel 606. The first of channels 606 presents a lower surface with an isolation cap 622 proximate bottom shield 626. The upper surface of the first of the channels 606 is in contact with the lower current drain 624, the spin injector 602 and the lower positioned spin detector 604, which incorporates optional barrier 620, free layer 616 (with direction of magnetization indicated by the arrow), and isolation cap 618.

The second of the channels 606 presents a lower surface, with an isolation cap 622 as illustrated, in contact with the central spin injector 602 and the second of the current drains 624. The upper surface of the second of the channels 606 is in contact with the upper spin detector 604, which incorporates barrier 620, free layer 616, and isolation cap 618. The top shield 628 is positioned above the upper spin detector 604. A side shield 617, or permanent magnet, is provided to either side of each of the detectors 604. The shared shield 625 lies between the bottom of the second of the channels 606 and the lower spin detector 604. In this configuration, the top shield 628 serves as the contact for the upper spin detector 604 while the shared shield 625 serves as the contact for the lower spin detector 604. Because the shared magnetic shield 625 serves as a contact for only one of the two spin detectors 604 the free-layer to free-layer spacing can be made thinner than in a stacked tunneling magnetoresistive (TMR) configuration where two independent shields/contacts are required. In the present embodiment, voltage, VI, is applied between the common spin injector 602 and the current drains 624 to produce a current charge and associated spin accumulation in channel 606. The spin accumulation is measured as a voltage potential change, V1 and V2, by respective detectors 604.

Referring now to FIGS. 8A-8B, the lateral spin valve multi-reader once again utilizes stacked detectors and a shared magnetic shield, however, in this embodiment each reader of the lateral spin valve multi-reader is provided with its own injector/channel/detector circuit. Specifically, lateral spin valve multi-reader 700 includes two spin injectors 702, two spin detectors 704, and two spin diffusion mediums, i.e. two channels 706 (with arrow indicating the direction of charge current flow), along with two current drains 724, a bottom shield 726, a shared shield 725, and a top shield 728. Each spin injector 702 includes an injector contact 708, an isolation cap layer 709, an anti-ferromagnetic layer 710, a ferromagnetic layer 712 (with direction of magnetization indicated by the arrow), and a barrier 714. Each spin detector 704 includes a barrier 720, a free layer 716 (with direction of magnetization indicated by the arrow), and an isolation cap 718.

The bottom shield 726 is proximate the lower surface of the lower channel 706, with lower isolation cap 722, while the top shield is proximate the upper surface of the upper channel 706, with upper isolation cap 722. Shared shield 725 lies between the isolation caps 718 of each of the spin detectors 704. A side shield 717, or permanent magnet, is provided to either side of each of the detectors 704.

The present embodiment provides a mirrored detector configuration where the lower detector 704 has the channel 706 and spin injector 702 below the free layer 716 and the upper detector 704 has the channel 706 and the spin injector 702 above the free layer 716. The shared shield 725 serves as the detector contact for both of the spin detectors 704. The stacked configuration of the reader 700 presents an opportunity of reducing thickness by reducing the free-layer to free-layer spacing. In the present configuration, voltage, VI1, is applied between the lower spin injector 702 and the lower current drain 724 to produce a current charge and associated spin accumulation in lower channel 706. Voltage, VI2, is applied between the upper spin injector 702 and the upper current drain 724 to produce a current charge and associated spin accumulation in the upper channel 706. The spin accumulation is measured as a voltage potential change, V1 and V2, by the lower and upper detectors 704, respectively.

Figure 9A:
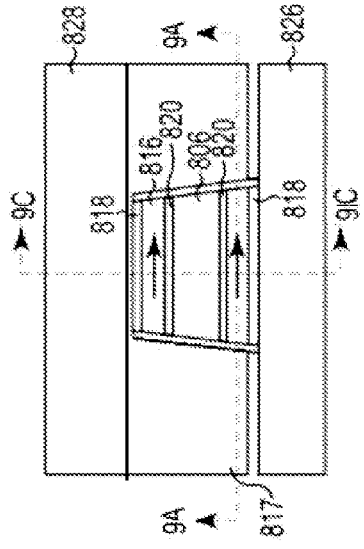
FIGS. 9A-9C depict a lateral spin valve multi-reader according to various embodiments with FIG. 9A providing a top view, FIG. 9B providing an ABS view, and FIG. 9C providing a side view.
Figure 9B:
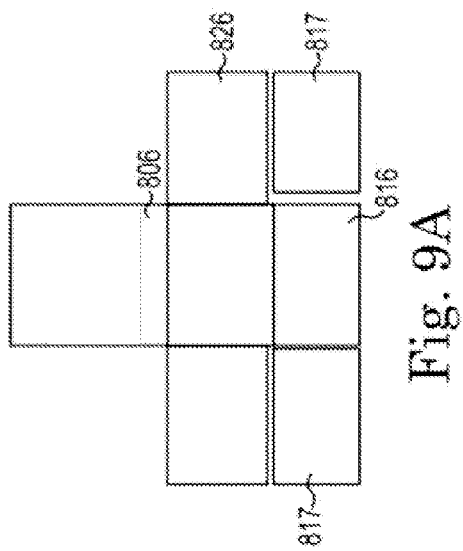
Figure 9C:
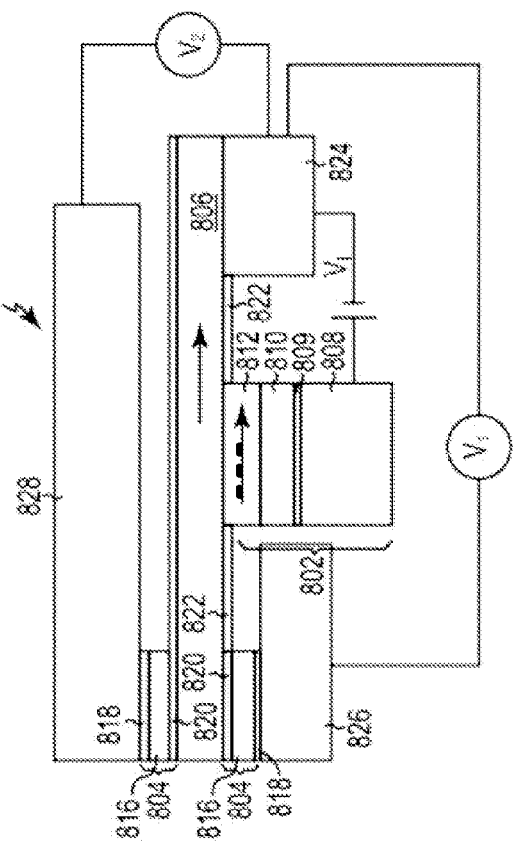
Figure 10:
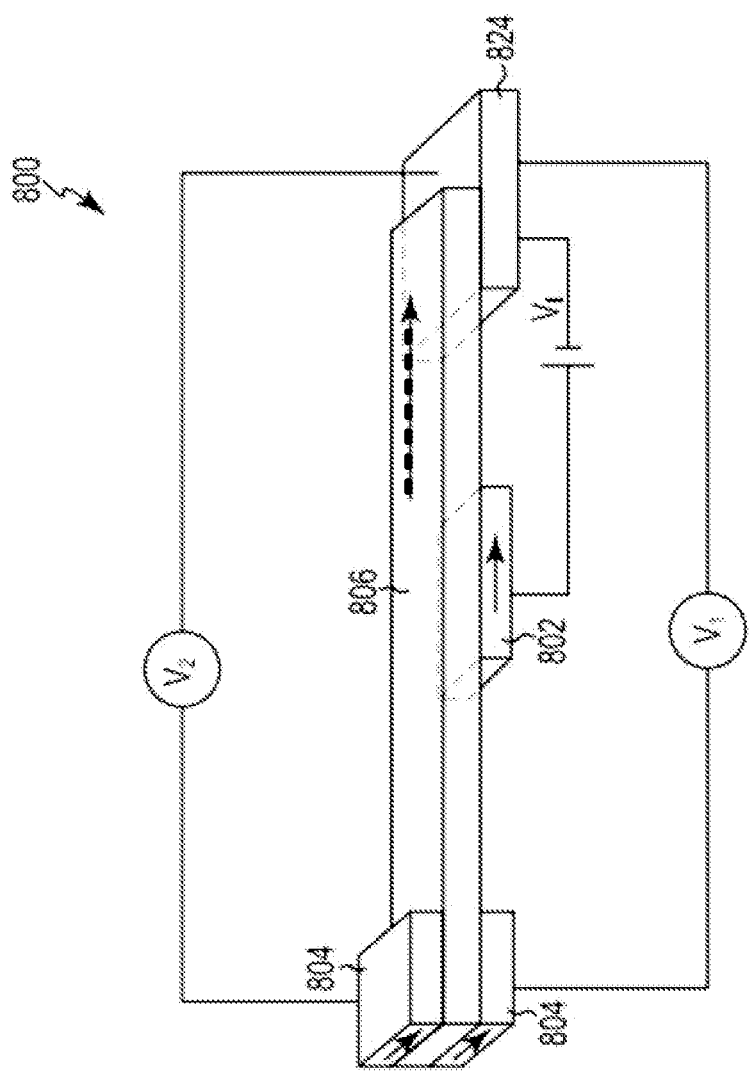
FIG. 10 illustrates the circuit created by the lateral spin valve multi-reader of FIGS. 9A-9C.

FIGS. 9A-9C illustrate another embodiment of the lateral spin valve multi-reader. In this configuration, stacked spin detectors utilize a common channel. Specifically, lateral spin valve multi-reader 800 includes a spin injector 802, two spin detectors 804, a spin diffusion medium, i.e., channel 806 (with arrow indicating the direction of charge current flow) with isolation cap 822, a current drain 824, a bottom shield 826 and a top shield 828. The spin injector 802 includes an injector contact 808, an isolation cap layer 809, an anti-ferromagnetic layer 810, and a ferromagnetic layer 812 (with direction of magnetization indicated by the arrow). Each spin detector 804 includes an optional barrier 820 proximate the channel 806, a free layer 816, and an isolation cap 818. The isolation cap 818 of the lower spin detector 804 presents the bottom shield 826, which operates as the contact of the lower detector 804. The isolation cap 818 of the upper spin detector presents to the top shield 828, which operates as the contact for the upper detector 804. A side shield 817, or permanent magnet, is provided to either side of the detectors 804. The present configuration, with a single common channel 806 and free layers 816 (with direction of magnetization indicated by the arrow) of the detectors 804 in a top and bottom orientation, provides a simpler geometry with low shield-to-shield spacing and the stacked detectors 804 in a downtrack direction. The circuit created by multi-reader 800 is illustrated in FIG. 10. In the circuit, voltage, VI, is applied between the spin injector 802 and the current drain 824 to produce a current charge and associated spin accumulation in channel 806. The spin accumulation is measured as a voltage potential change, V1 and V2, by the lower and upper detectors 804, respectively.

FIGS. 11A-11C illustrate another embodiment of the lateral spin valve multi-reader. In this configuration a separating, critical tunnel barrier may be eliminated allowing the spin accumulation interface to be upon any face of the detector. Specifically, lateral spin valve multi-reader 900 includes a spin injector 902, two spin detectors 904, a spin diffusion medium, i.e., channel 906, a current drain 924, a bottom shield 926, and an upper shield 928. The spin injector 902 includes an injector contact 908, a seed layer 909, an anti-ferromagnetic layer 910, and a ferromagnetic layer 912 (with direction of magnetization indicated by the arrow). Each spin detector 904 comprises only a free layer 916 (with direction of magnetization indicated by the arrow) with a contact 921 to the outer edge of each free layer 916. The channel 906 resides between the inner edges of the free layers 916. The channel 906 is provided with a lower isolation cap 922, as illustrated, and an upper isolation cap 923. Optionally, additional seed and cap layers may be included, which may be helpful to produce optimal channel layer properties.

The present configuration provides two detector free layers 916 arranged in the crosstrack direction with a central channel 906, thus, very narrow shield-to-shield and crosstrack spacing is enabled. Alternatively, the channel 906 may contact the free layers 916 at the back of the stack or the back and sides to allow detection of the electric potential change. The free layer stabilization of this embodiment may be achieved by creating uniaxial anisotropy parallel to the air bearing surface (ABS) direction through a Controlled Incidence Sputtering (CIS or sometimes referred to as Oblique Angle Sputtering) deposition technique. In the present embodiment, voltage, VI, is applied between the spin injector 902 and the current drain 924 to produce a current charge and associated spin accumulation in channel 906. The spin accumulation is measured as a voltage potential change, V1 and V2 (not shown), by respective detectors 904.

Systems, devices or methods disclosed herein may include one or more of the features structures, methods, or combination thereof described herein. For example, a device or method may be implemented to include one or more of the features and/or processes above. Or, layers described in one embodiment may be incorporated into another embodiment without specific recitation. Or, the lateral spin valve multi-reader may include any number of readers rather than being limited to two. It is intended that any device or method described above need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A reader comprising:
   at least two spin detectors;
   a spin injector;
   a spin diffusion medium that bridges the spin detectors and the spin injector; and
   a current drain coupled to the spin diffusion medium, a voltage applied between the current drain and the spin injector inducing a spin accumulation in the spin diffusion medium, each of the spin detectors being configured to detect a unique spin accumulation signal.

2. The reader of claim 1, further comprising a shield to magnetically bias one or more of the spin detectors.

3. The reader of claim 1, further comprising a top split shield divided into a first shield portion and a second shield portion wherein one of the spin detectors is shielded by the first shield portion and the other of the spin detectors is shielded by the second shield portion.

4. The reader of claim 1, wherein the at least two spin detectors are located side-by-side in a cross-track direction.

5. The reader of claim 1, wherein each of the spin detectors has a separate electrical lead in contact therewith.

6. The reader of claim 5, further comprising at least two spin injectors and at least two spin diffusion mediums.

7. The reader of claim 1, further comprising a top shield separated from the at least two spin detectors by an in-stack shield.

8. The reader of claim 7, wherein the in-stack shield operates as an electrical contact for the at least two spin detectors.

9. The reader of claim 1, wherein the at least two spin detectors are stacked in a down-track direction.

10. The reader of claim 9, further comprising a central shield separating the at least two spin detectors.

11. The reader of claim 10, wherein the central shield operates as an electrical contact for one or both of the spin detectors.

12. A reader comprising:
    means for injecting a polarized current;
    means for receiving the injected current and for producing a polarized spin accumulation associated with the injected current; and
    at least two means for detecting, each means for detecting detects a portion of the spin accumulation.

13. The reader of claim 12, further comprising means for draining charge current coupled to the means for receiving charge current.

14. The reader of claim 12, further comprising means for magnetically biasing one or more of the means for detecting.

15. The reader of claim 12, further comprising means for shielding the means for detecting, wherein the means for shielding is divided into two portions, one portion shielding one of the means for detecting and the other portion shielding another of the means for detecting.

16. The reader of claim 12, further comprising means for providing an electrical contact for the means for detecting, wherein each of the means for detecting has its own means for providing the electrical contact.

17. The reader of claim 12, wherein the at least two means for detecting are located side-by-side in a cross-track direction.

18. The reader of claim 12, wherein the at least two means for detecting are stacked in a downtrack direction.

19. The reader of claim 12, further comprising a first shielding means for shielding the means for detecting and a second shielding means for shielding the means for detecting, the second shielding means positioned intermediate the first shielding means and the means for detecting.

20. The reader of claim 19, wherein the second means for shielding also comprises a means for providing an electrical contact for each of the means for detecting.

21. The reader of claim 12, further comprising a central shielding means for separating the at least two means for detecting.

22. The reader of claim 21, the central shielding means also comprising means for providing an electrical contact for one or all of said means for detecting.

23. A process comprising:
    injecting a polarized spin current into a spin diffusion medium to produce an associated spin accumulation, the spin current being induced by a voltage applied between a current drain and a spin injector, the current drain being coupled to the spin diffusion medium;
    detecting a first portion of the spin accumulation; and
    detecting a second portion of the spin accumulation.

24. The process of claim 23, further comprising draining a portion of the injected charge current.

25. The process of claim 23, further comprising detecting the first portion of the spin accumulation and detecting the second portion of the spin accumulation in relation to one or more electrical contacts.

26. The process of claim 23, further comprising detecting the first portion of the spin accumulation and detecting the second portion of the spin accumulation in relation to one or more established magnetic biases.

* * * * *